March 15, 1927.

W. J. IRVIN 1,621,114

MOLDING MACHINE

Filed June 20, 1921  5 Sheets-Sheet 1

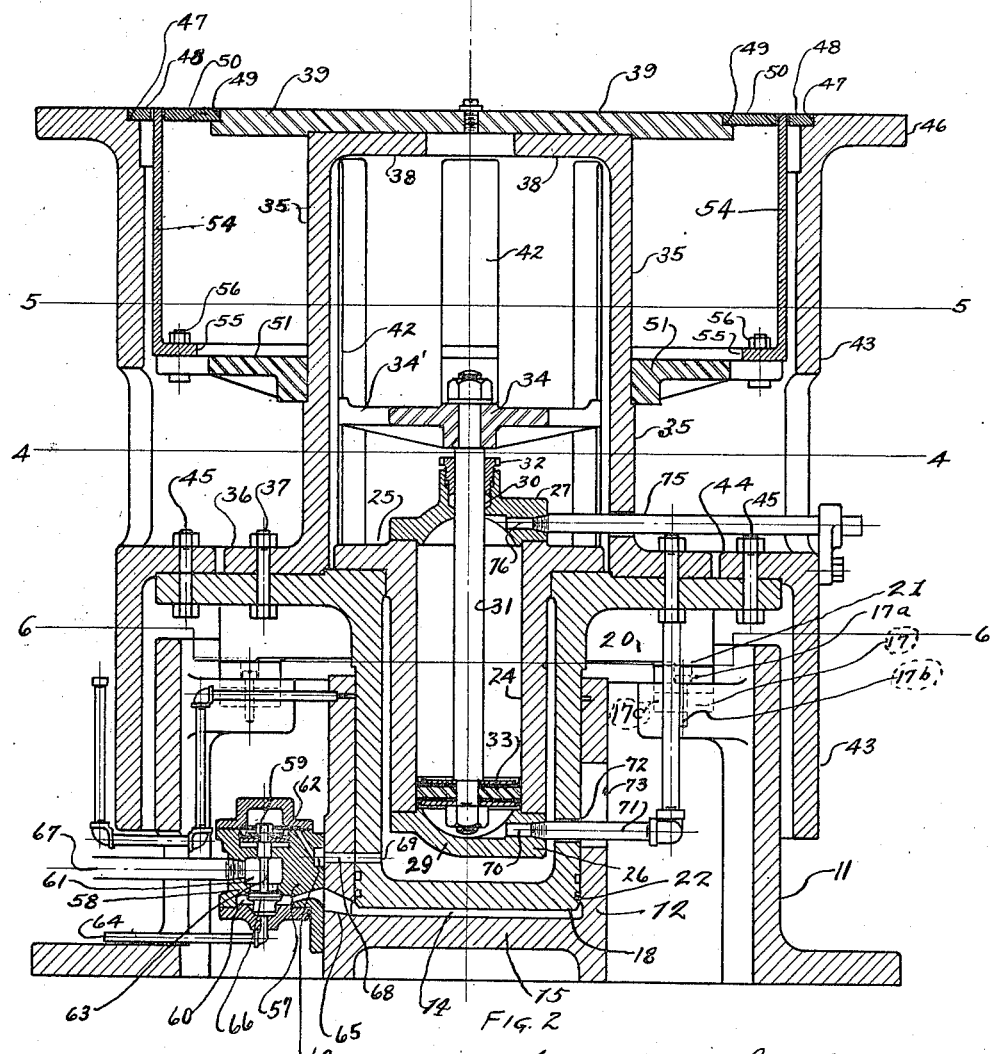

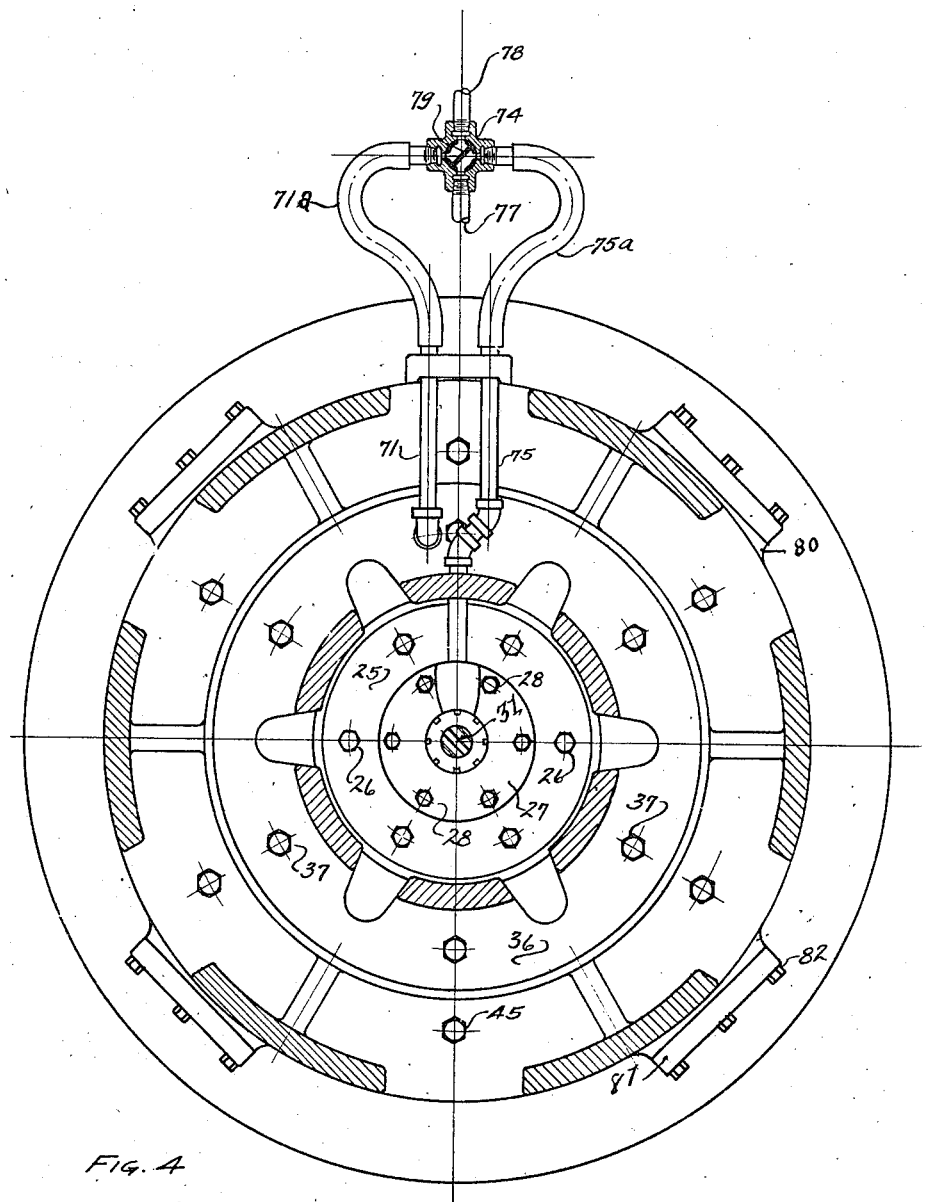

March 15, 1927.

W. J. IRVIN

MOLDING MACHINE

Filed June 20, 1921

Walter J. Irvin, Inventor

By W. E. Shammus, Attorney

Patented Mar. 15, 1927.

1,621,114

UNITED STATES PATENT OFFICE.

WALTER J. IRVIN, OF AKRON, OHIO.

MOLDING MACHINE.

Application filed June 20, 1921. Serial No. 478,803.

This invention relates to certain new and useful improvements in molding machines and has particular reference to a machine which may be used to advantage to form sand molds for casting pulleys, wheels and other circular objects.

In general, the object of the invention is to provide means for manufacturing molds whereby castings of good quality may be quickly and uniformly produced with a minimum amount of labor at a low cost.

Another object of the invention is to provide a strong, durable machine of simple, comparatively inexpensive construction and to combine therein a pattern manipulating means and jolting means so that a flask may be positioned thereon and an accurate sand mold quickly constructed therein.

A further object of the invention is to provide an improved machine for manufacturing sand molds for casting pulleys and the like, whereby pattern of various diameters may be interchangeably employed and to provide new and improved, regulatable means for effecting a vertical movement of said pattern so that the same pattern may be used for manufacturing molds for pulleys of different widths.

A still further object lies in the provision of a machine which will accomplish the above objects and which in addition will embody improved jolting means for uniformly packing sand about the pattern.

The above and additional objects are accomplished by the novel construction, combination and arrangement of parts hereinafter described and illustrated in the drawings, wherein I have shown a preferred embodiment of the invention, it being understood that the invention is capable of various adaptations and that changes, modifications and alterations may be made or substitutions resorted to which come within the scope of the claims hereunto appended.

In the drawings in which similar numerals of reference have been employed to designate the same or similar parts as they may occur throughout the several views:—

Figure 2 is a view showing the pattern in an inoperative position.

Figure 3 is a fragmentary view showing in central vertical section the top portion of my improved device and illustrating a pattern of smaller diameter used therein.

Figure 4 is a horizontal sectional view taken as indicated by the line 4—4 of Figure 2.

Figure 1:
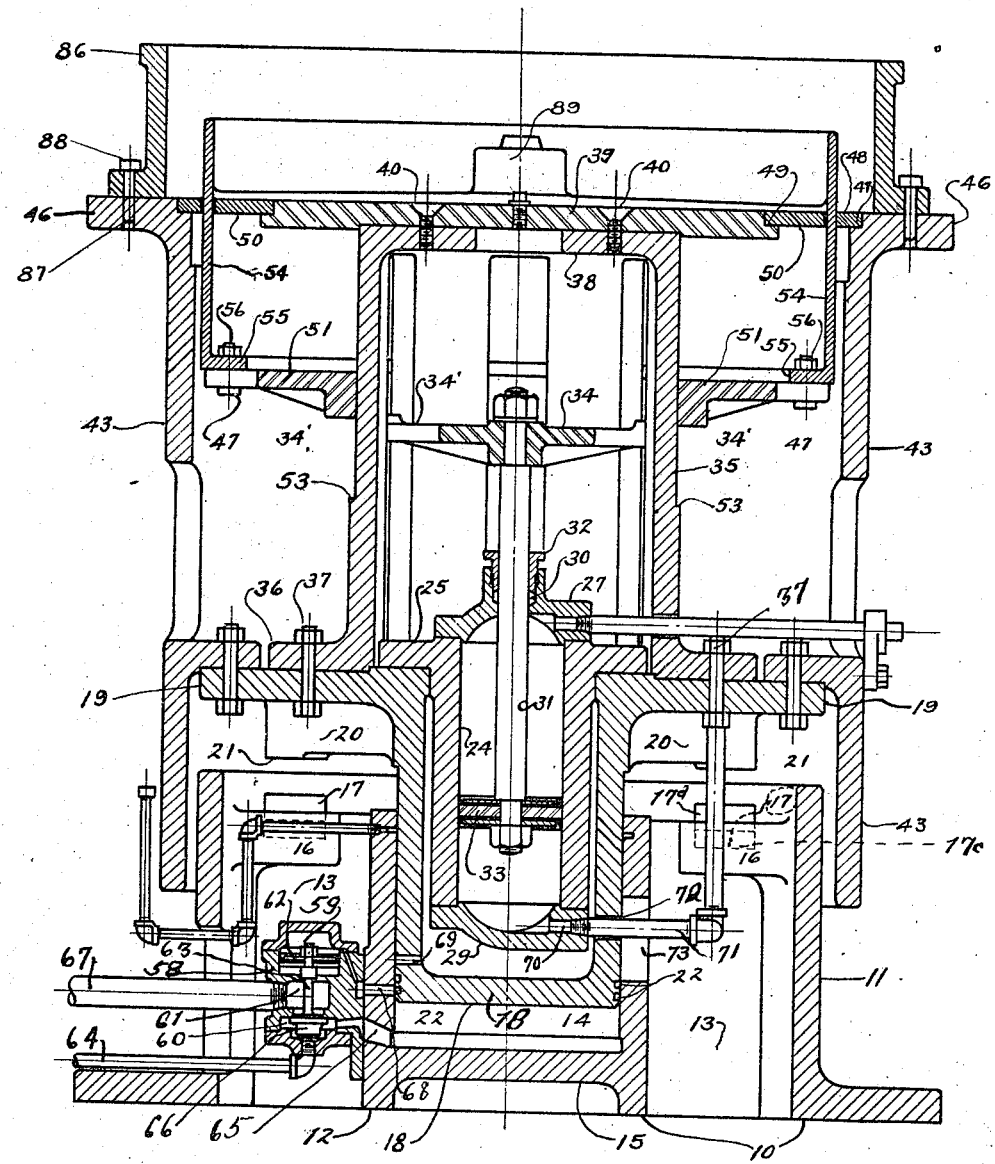
Figure 1 is a central vertical sectional view of my improved device, also showing a similar sectional view of a molding flask positioned thereon with the pattern in an operative position.

Referring now to a detailed description of the invention, as illustrated in the accompanying drawings, the numeral 10 is employed generally to denote a supporting base member which comprises a vertically disposed cylindrical outer portion 11 and a cylindrical inner portion 12 which is concentrically arranged in respect to the outer portion 11 and is integral therewith being connected thereto by a plurality of regularly spaced radially directed vertical webs 13. The inner cylindrical portion 12 is provided with a bore 14 and is closed adjacent its lower end by a' wall 15 which extends thereacross in spaced relation to the lower end of said inner portion 12. The lower end of the inner portion 12 is on a level with the lower end of the outer portion 11, but the said inner cylindrical portion 12 is relatively shorter than said outer portion. The numeral 16 denotes a bumper bracket which comprises an enlargement which protrudes from each side of each rib 13 and projects inwardly from the inner wall of the outer portion 11 with the upper face of each bracket in the same horizontal plane with the upper edge of the cylindrical portion 12 and the upper edges of the webs 13. Each bracket 16 is provided with a cylindrical bore 17 which projects downwardly from the upper face thereof, and forms a seat for a bumper block 17$^a$ which is secured therein by means of the screw bolt 17$^b$, a rubber cushion 17$^c$ being first inserted in said bore 17. A hollow cylindrical member 18, which is closed at its lower end, is formed to fit snugly in the bore 14 with the upper end thereof projecting upwardly from the upper end of the cylinder 12. The member 18 is provided at its upper end with a wide radially directed, circumferentially extending flange 19. The brackets 20 extend outwardly and radially from the upper portion of the member 18 and downwardly from the flange 19 and each bracket 20 is provided with a downwardly projecting cylindrical portion 21 adapted to normally rest on the bumper block 17ª on the bracket 16 as clearly shown in Figure 2. The member 18 is provided adjacent its lower end with circumferentially extending grooves adapted to receive suitable packing rings 22 so that a tight joint is formed between said member 18 and the cylinder 12 so as to render the member 18 capable of being forced upwardly in the bore 14 as hereinafter described.

The numeral 24 denotes a fluid pressure cylinder which is slightly enlarged adjacent the upper end to snugly fit in the cavity of the hollow cylinder 18. The upper end of the pressure cylinder 24 is provided with an outwardly projecting, circumferentially extending, flange 25 which is adapted to rest on the upper face of the cylinder member 18 to which it is secured by means of the bolts 26. The pressure cylinder 24 is provided at its upper end with a cylinder head 27 which is secured to said pressure cylinder by means of the bolts 28. The lower end of the cylinder 24 is closed by a head 29 which is similarly secured thereto. The cylinder head 27 is provided with a centrally positioned bore 30 in which is mounted the piston rod 31. The bore 30 is offset larger at the upper end thereof and is internally threaded to receive the usual stuffing box 32 which is employed to maintain a tight joint between the cylinder head and said piston rod. A piston 33 is operatively positioned in the cylinder 24 and is suitably secured to the lower end of the rod 31. The rod 31 projects upwardly from the cylinder head 29 and is provided on its upper end with a spider 34. The spider 34 is provided with a plurality of arms 34' which are arranged thereon so as to project radially from the upper end of the rod 31.

The hollow cylindrical center post, which is denoted by the numeral 35, is provided at its lower end with an outwardly projecting, circumferentially extending flange 36 and the said center post is supported by the member 18 to which it is secured by means of the bolts 37 which secure the flange 36 to the flange 19. The center post 35 is provided at its upper end with an inwardly projecting, circumferentially extending flange 38. A circular top plate 39 is positioned on the upper end of the post 35 to which it is secured by means of the bolts 40 which extend through bores in the said top plate and are threaded into suitable bores in the flange 38. The walls of the center post are provided with a plurality of longitudinally directed slots or openings 42 which are arranged therein at regularly recurring points so as to receive the ends of the arms 34' which project therethrough. Each of the openings 42 extend from a point adjacent to the upper end of the post 35 to the bottom thereof and the said openings extend outwardly into the flange 36, thus forming a plurality of openings in said flange 36 for the purpose of receiving the arms 34' on the spider 34 so that the device may be easily assembled.

The numeral 43 denotes an upright hollow cylindrical member which is provided intermediate its height with an inwardly projecting, circumferentially extending flange 44 which is supported by the flange 19 to which it is secured by means of the bolts 45. The cylindrical member 43 is provided at its upper edge with a circumferentially extending flange 46 which projects outwardly from the extreme upper edge thereof. The flange 46 is concentrically arranged around the top plate 39 in spaced relation thereto and the upper face of the flange lies in the same horizontal plane with the upper face of said top plate. At the top of the member 43 its inner edge is cut away to form a circumferentially extending rabbet 47 which is adapted to receive the outer edge of the ring 48. The upper peripheral edge of the top plate 39 is likewise cut away to provide a circumferentially extending rabbet 49 which is adapted to receive the inner circumferential edge of the ring 50 and support the same therein.

Figure 5:
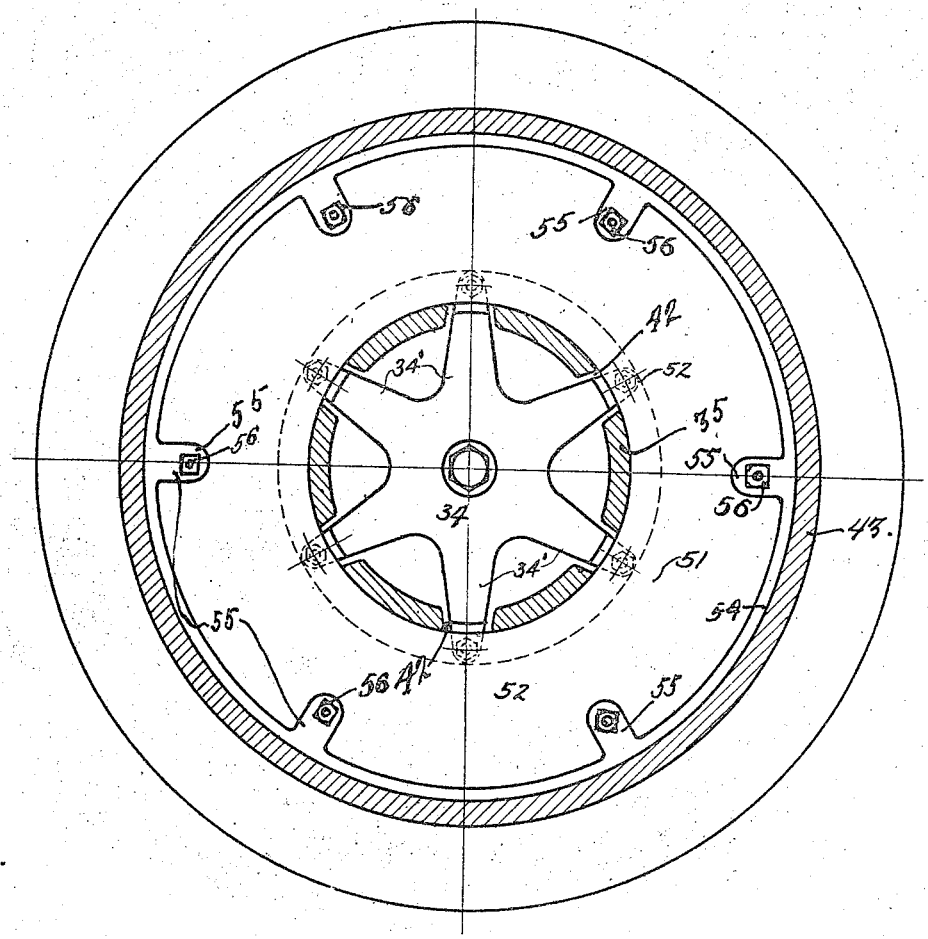
Figure 5 is a similar sectional view taken as indicated by the line 5—5 of Figure 2.
Figure 6:
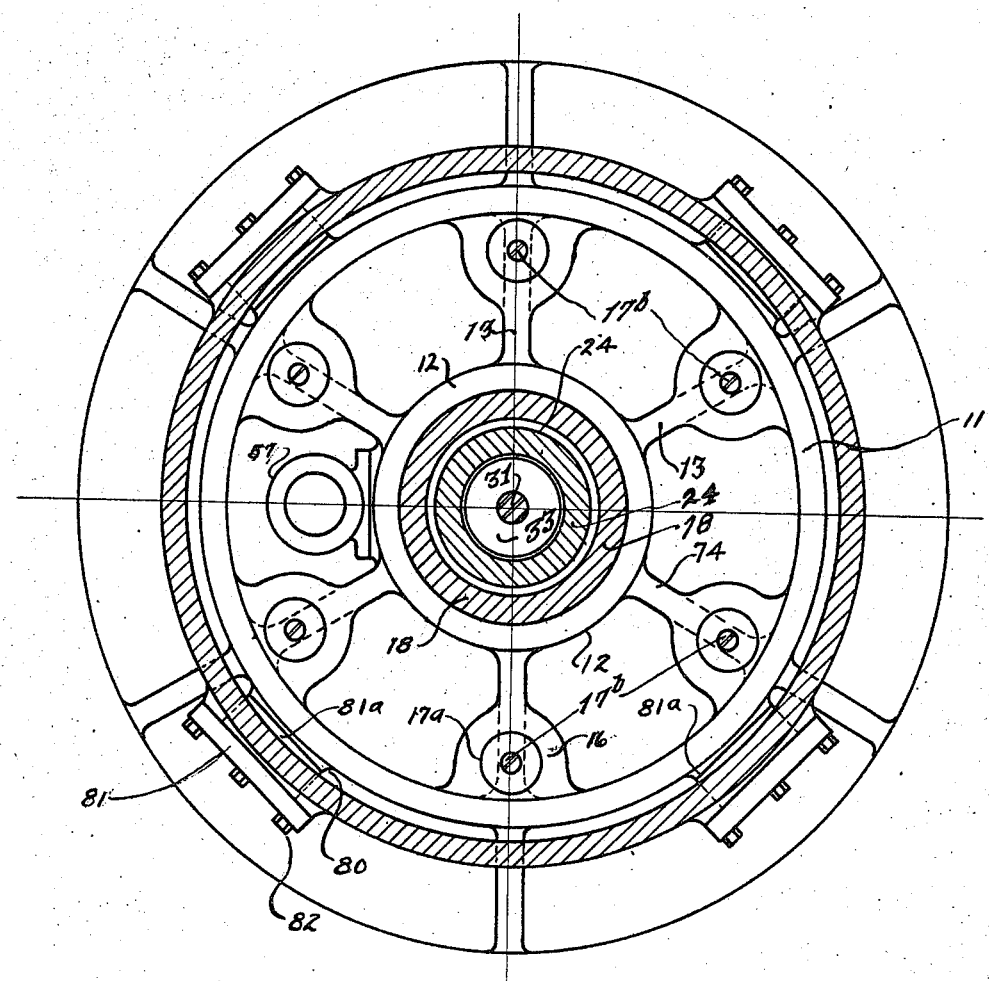
Figure 6 is a horizontal sectional view taken on line 6—6 of Figure 2.

The arms 34' which are positioned in the slots 42 as hereinafter set forth project outwardly past the outer wall as shown by the dotted lines in Figure 5. A pattern supporting ring 51 is positioned around the center post 35 so as to be supported by the arms 34' to which it is secured by means of the bolts 52. The upper portion of the post 35 is offset smaller to form the shoulder 53 adapted to support the ring 50 and limit the downward movement thereof. A pattern ring 54 which, in the adaptation of the invention shown conforms in shape to the rim of a pulley is supported by said ring 51. The pattern ring 54 is provided at its lower edge with a plurality of inwardly projecting lugs 55 which are secured to the ring 51 by means of the bolts 56.

The numeral 57 denotes an automatic valve arranged to be operated by compressed air or other fluid under pressure. The valve 57 comprises a casing 58 having an upper chamber 59, a lower chamber 60 and a central chamber 61. A piston 62 is mounted in the upper chamber and a piston rod 63 extends therefrom through a suitable bore and through the central chamber to the said lower chamber. An inlet pipe 64 carrying compressed air or other fluid under pressure communicates with said lower chamber and an exhaust pipe 67 leads from said central chamber to the atmosphere. A passage 65 runs from said lower chamber to the cavity 14 in the cylinder 12. The lower end of the rod 63 is provided with a valve head 66 which is of less diameter than the piston 62, and which, when the piston 62 is in an upward position, closes the opening between the lower chamber and the central chamber. When the piston 62 is at the lower end of its stroke, it opens the passage between the central chamber and the lower chamber and closes the opening leading to said lower chamber from the supply line 64. The numeral 68 indicates an opening in the walls of the cylinder 12 and the numeral 69 denotes a passage running from said opening 68 to the upper chamber 59.

The numeral 69 denotes a port which is positioned in the wall of the member 18 so as to communicate with the opening 68 when the member is in a downward position in said cylinder 12 as shown in Figure 2. The lower cylinder head 29 of the pressure cylinder 24 is provided with an opening 70 into which is threaded a pipe 71. The pipe 71 extends outwardly from said cylinder 24 through an opening 72 in the wall of the member 18, the opening 72 being relatively larger than the pipe 71 to provide an air vent which serves a purpose to be hereinafter described. The pipe 71 also extends through a vertically disposed slot 73 in the wall of the inner cylindrical portion 12 and the said pipe extends upwardly through a suitable opening in the flange 19 and is operatively connected to a four-way valve 74 by means of the flexible conduit 71ª. The upper cylinder head 27 on the pressure cylinder 24 is also provided with an opening 76 into which is secured a pipe 75 which is operatively connected to the valve 74 by the flexible conduit 75ª. The valve 74 comprises a casing having an inlet pipe 77 leading from a supply of fluid under pressure and the said casing is also provided with a waste pipe 78. The numeral 79 is used to denote a valve core which may be rotated to close the opening in the casing from the inlet pipe 77 or may be rotated to direct fluid from said inlet pipe or to either the pipe 71 or 75. When the valve core is positioned as shown in Figure 4, the fluid is directed into the pipe 75 and the piston 33 is forced to a downward position in the cylinder 24. In this position the pipe 71 is connected to the waste pipe 78 providing a free passage through which the water or other fluid may be forced from underneath the piston 33. It is apparent that the valve 74 may be operated to direct fluid pressure into the pipe 71 in which event the pipe 75 will be connected to the waste pipe 78. The outer cylindrical portion 11 of the base 10 is provided adjacent the outer edge thereof with a plurality of integral outwardly protruding portions 80. Each protruding portion 80 is provided with a flat face which is disposed at a right angle to a radius of the base 10. Openings are formed in the walls of the member 43 at points adjacent the protruding portions 80 and a plate 81 is secured over each opening by means of the bolts 82. The plate 81 has an inwardly protruding portion 81ª which projects through said opening and slides on the flat face of the outwardly protruding portion 80. The inner face of the protruding portion 81ª is flat so that the cylindrical member 43 is capable of being moved vertically but is held against rotation.

If desired the annular member 83 may be employed as shown in Figure 3. The member 83 is adapted to seat in the rabbet 47 and is provided with a downwardly projecting annular flange 84 which is adapted to fit snugly in the opening in the cylinder member 43. The annular member 83 is provided at its inner edge with a circumferentially extending, rabbet 85 which is similar to the rabbet 47 and is adapted to receive a ring 48. It will thus be seen that I have provided a circular, flask supporting table which includes the flange 46, the rings 48 and 50 and the center plate 29.

In use, a flask section 86 is placed on the table and the flask pins 88 are inserted in suitable bores 87 in the flask 86 to hold the flask against lateral movement on said table. The hub and spoke pattern 89 is spaced on the flask table and properly arranged thereon and the valve 74 is then operated to connect the pipe 71 with the supply pipe 77 and the pipe 75 with the waste pipe 78 and fluid under pressure, preferably water, is then introduced through the pipe 71 to the cylinder 24 and the pattern 54 is forced upwardly between the rings 48 and 50. When the pattern projects the proper distance above the flask table, the valve 74 is operated so that both the supply pipe 77 and the waste pipe 78 are closed and the pattern 45 is thus firmly held in position. The flask section 86 is then filled with sand and fluid under pressure, preferably compressed air is introduced through the inlet pipe 64. As the air under pressure enters the said valve, the valve 66 is operated and the air is admitted to the chamber 14, quickly raising the cylindrical member 18 in the inner cylindrical base portion 12. As the cylinder reaches the position shown in Figure 1 the air is admitted through the ports 68 and 69 to the upper chamber 59. Inasmuch as the piston 62 has a larger diameter than the valve 66, the said piston 62 is forced downwardly in the chamber 59, thus closing the inlet opening in the chamber 60 and opening the passage between the lower chamber 60 and the center chamber 61, thus permitting compressed fluid to escape from the chamber 14 outwardly through the pipe 67. The cylindrical member 18 will thus be forced by gravity to the downward position shown in Figure 2, and the block 21 will be brought into sudden contact with the block 17, whereupon the port 68 will be brought into communication with the port 69 and the fluid under pressure in the chamber 59 will pass through said ports into the cavity of the member 18 from which it may freely escape through the opening 72. As the fluid pressure in the chamber 59 is released the valve 66 is forced upwardly as hereinbefore set forth, and the cylindrical member 18 is successively subjected to a rapid upward and downward movement.

It will thus be seen that I have provided automatic means whereby the member 18 and all of the parts supported thereby may be successively lifted and released to drop on the blocks 17 and that sand in the flask 86 will be jolted firmly about the pattern 54.

The fluid supply pipe 64 is then closed preferably by the operation of a valve (not shown) and the valve 74 is operated to the position shown in Figure 4. Fluid pressure is thus admitted through the pipe 75 to the upper end of the cylinder 24 and the piston 33 is forced downwardly in said cylinder. It will be noted that the pipe 71 is thus placed in communication with the waste pipe 78 and that the fluid in the lower part of the cylinder 24 will be forced out therethrough. The rim pattern 54 is thus lowered to the position shown in Figure 2 and the flask section 86 is removed from the table.

It will be seen that a single machine constructed in accordance with this invention may be employed to manufacture molds for pulleys of different widths inasmuch as the pattern may be easily regulated to project as desired above the flask table.

It will also be seen that one pattern 54 may be quickly removed from the machine and as quickly replaced by a pattern 54 of a different diameter and that the rings 48 and 49 may be furnished in a plurality of sizes and selectively used to close the opening in each side of the pattern 54.

Having thus disclosed the embodiment of my invention and submitted a detailed description of same, what I claim as new and desire to secure by Letters-Patent is:—

1. In a device of the character described, a suitable base embodying a vertically disposed pressure cylinder, a hollow cylindrical member operatively mounted therein, an outer cylindrical wall and a tubular center post supported thereby, a table comprising a flange on said wall and a circular plate on said post, a cylindrical pattern concentrically arranged between said post and said flange, means to raise and lower said pattern so that a portion thereof will project above said table and means to utilize fluid pressure to cause a vertical jolting movement of said cylindrical member in said cylinder.

2. In a device of the character described, a suitable base embodying a vertically disposed pressure cylinder, a hollow cylindrical member mounted therein, automatic means to successively introduce fluid pressure to said cylinder and release the same therefrom so as to produce a rapid jolting movement of said member, a tubular center post and a cylindrical wall mounted on said member, a table comprising an outwardly projecting annular flange on said wall and a circular plate on said post, said center post provided with a plurality of spaced vertical slots and having a spider therein with the arms of the spider projecting from said slots, an annular plate supported on the outwardly projecting ends of said arms, a cylindrical pattern concentrically arranged between said post and said wall and supported by said plate, a fluid pressure cylinder secured in said cylindrical member, a piston on said cylinder, a piston rod extending upwardly from said piston to support said spider, a four-way valve, a pipe leading from the upper end of said cylinder to said valve, a similar pipe leading from the lower end of said cylinder to said valve and a fluid supply pipe and a waste pipe operatively connected to said valve.

3. In a device of the character described, a suitable base, a vertically disposed pressure cylinder integral therewith, a hollow cylindrical member operatively mounted in said pressure cylinder, an outwardly projecting annular flange on said member, an outer cylindrical wall and a tubular center post secured to said flange, a table comprising an outwardly projecting annular flange on the upper end of said wall and a circular plate on said post, a cylindrical pattern concentrically arranged between said post and said flange, fluid pressure means to raise and lower said pattern so that a portion thereof will project above said table and means to utilize fluid pressure to cause a vertical jolting movement of said cylindrical member in said pressure cylinder.

4. In a device of the character described, a suitable base including an integral, vertically disposed pressure cylinder, a hollow cylindrical member mounted therein, automatic means to successively introduce fluid pressure to said cylinder and release the same therefrom so as to produce a rapid jolting movement of said member, an annular flange projecting outwardly from the upper edge of said member, a tubular center post and a cylindrical wall mounted on said member, a table comprising an outwardly projecting annular flange on said wall and a circular plate on said post, said center post provided with a plurality of spaced vertical slots and having a spider therein with the arms of the spider projecting from said slots, an annular plate supported between said spider, a cylindrical pattern concentrically arranged between said post and said wall and supported by said plate, a ring between said center plate and said pattern and a ring between said wall and said pattern, a fluid pressure cylinder secured in said cylindrical member, a piston on said cylinder, a piston rod extending upwardly from said piston to support said spider, a four-way valve, a pipe leading from the upper end of said cylinder to said valve, a similar pipe leading from the lower end of said cylinder to said valve and a fluid supply pipe and a waste pipe operatively connected to said valve.

5. In a device of the class described, a tubular base standard including a vertically disposed cylinder, a piston mounted in said cylinder, pattern supporting means carried by said piston, flask supporting means also carried thereby, a vertically movable rim pattern concentrically arranged therebetween and regulatable means to move said rim pattern upwardly so that a portion thereof will project above said pattern supporting means.

6. In a device of the character described, a base including a vertically disposed cylinder, a hollow piston mounted therein said piston carrying a tubular casing and a center post, a flask supporting flange on said casing, a pattern supporting plate on said post, a vertically movable rim pattern concentrically arranged between said post and said casing and fluid actuated mechanism to impart a jolting movement to said piston.

7. In a device of the class described, a base including a vertically disposed cylinder, a hollow support mounted therein, said support carrying a tubular casing and a center post, a flask supporting flange on said casing, a pattern supporting plate on said post, a vertically movable rim pattern concentrically arranged between said post and said casing, a pressure cylinder in said support, a piston in said pressure cylinder, means connecting said piston with said pattern and regulatable means for supplying fluid pressure to said pressure cylinder whereby the piston may be moved upwardly or downwardly therein.

8. In a device of the class described, a base including a vertically disposed cylinder, a hollow support mounted therein; automatically regulatable means for successively supplying to and releasing fluid pressure from said cylinder to produce a jolting movement of said support, said support carrying a tubular casing and a center post, a flask supporting flange on said casing, a pattern supporting plate on said post, a vertically movable rim pattern concentrically arranged between said post and said casing, a pressure cylinder in said support, a piston in said pressure cylinder, means connecting said piston with said pattern and regulatable means for supplying fluid pressure to said pressure cylinder whereby the piston may be moved upwardly or downwardly therein.

In testimony whereof I have hereunto set my hand.

WALTER J. IRVIN.